(12) United States Patent
Magee

(10) Patent No.: US 12,492,059 B2
(45) Date of Patent: Dec. 9, 2025

(54) PACKAGING MATERIAL

(71) Applicant: Carlton Packaging LLP, Bedford (GB)

(72) Inventor: Marcus Magee, Bedford (GB)

(73) Assignee: CARLTON PACKAGING LLP, Bedford (GB)

( * ) Notice: Subject to any disclaimer, the term of this patent is extended or adjusted under 35 U.S.C. 154(b) by 0 days.

(21) Appl. No.: 18/541,049

(22) Filed: Dec. 15, 2023

(65) Prior Publication Data

US 2024/0140671 A1  May 2, 2024

Related U.S. Application Data

(63) Continuation of application No. 17/767,174, filed as application No. PCT/GB2020/052437 on Oct. 2, 2020, now abandoned.

(30) Foreign Application Priority Data

Oct. 7, 2019 (GB) .................................. 1914421

(51) Int. Cl.
*B32B 3/24* (2006.01)
*B31B 70/14* (2017.01)
(Continued)

(52) U.S. Cl.
CPC .............. *B65D 81/03* (2013.01); *B31B 70/14* (2017.08); *B31D 5/0065* (2013.01); *B32B 3/263* (2013.01);
(Continued)

(58) Field of Classification Search
None
See application file for complete search history.

(56) References Cited

U.S. PATENT DOCUMENTS 3,040,966 A * 6/1962 Crane .................... B65D 29/04
383/118
3,040,968 A    6/1962 Long et al.
(Continued)

FOREIGN PATENT DOCUMENTS

CN  201990066 U  *  9/2011
CN  202244644 U  *  5/2012
(Continued)

OTHER PUBLICATIONS

Machine Translation of CN102733266A, Oct. 2012 (Year: 2012).*
(Continued)

*Primary Examiner* — Jeffrey A Vonch
(74) *Attorney, Agent, or Firm* — Woodard, Emhardt, Henry, Reeves & Wagner, LLP

(57) ABSTRACT

The invention relates to the packaging of one or more articles in a packaging sheet material which is moveable from a first condition to a second, expanded, condition to improve the packaging effect of the sheet material. In accordance with the invention the sheet material includes a first portion with apertures which can be moved to an open position to create the second, expanded, condition and at least one, but typically a plurality of spaced apart, second portions which have no apertures, or a different shape and/or pattern of apertures than the apertures of the first portion, so as to form a surface of the said second portion more suitable for the application of a label and/or indications thereon when the sheet material is in the second expanded condition.

17 Claims, 3 Drawing Sheets

(51) Int. Cl.
| | |
|---|---|
| B31D 5/00 | (2017.01) |
| B32B 3/26 | (2006.01) |
| B32B 3/28 | (2006.01) |
| B32B 29/00 | (2006.01) |
| B65B 11/00 | (2006.01) |
| B65D 65/02 | (2006.01) |
| B65D 65/38 | (2006.01) |
| B65D 65/40 | (2006.01) |
| B65D 81/02 | (2006.01) |
| B65D 81/03 | (2006.01) |
| B31B 70/00 | (2017.01) |
| B31B 70/16 | (2017.01) |
| B31B 70/20 | (2017.01) |
| B31B 70/88 | (2017.01) |
| B31B 170/20 | (2017.01) |
| B31B 170/30 | (2017.01) |
| B32B 3/30 | (2006.01) |

(52) U.S. Cl.
CPC ............ *B32B 3/266* (2013.01); *B32B 29/00* (2013.01); *B32B 29/005* (2013.01); *B65B 11/004* (2013.01); *B65D 65/406* (2013.01); *B65D 65/44* (2013.01); *B31B 70/002* (2017.08); *B31B 70/16* (2017.08); *B31B 70/20* (2017.08); *B31B 70/88* (2017.08); *B31B 2170/20* (2017.08); *B31B 2170/30* (2017.08); *B32B 3/28* (2013.01); *B32B 3/30* (2013.01); *B32B 2250/26* (2013.01); *B32B 2553/00* (2013.01); *B32B 2553/02* (2013.01); *B65D 65/02* (2013.01); *B65D 65/38* (2013.01); *B65D 65/40* (2013.01); *Y10S 428/9033* (2013.01); *Y10S 428/906* (2013.01); *Y10T 428/24149* (2015.01); *Y10T 428/24281* (2015.01); *Y10T 428/24289* (2015.01); *Y10T 428/24306* (2015.01); *Y10T 428/24314* (2015.01); *Y10T 428/24322* (2015.01); *Y10T 428/24331* (2015.01)

(56) References Cited

U.S. PATENT DOCUMENTS

| | | | | |
|---|---|---|---|---|
| 3,042,278 | A | * | 7/1962 | Mccullough ....... B65D 83/0882 225/34 |
| 3,407,987 | A | * | 10/1968 | Heinz ................. B65D 65/403 229/87.02 |
| 3,494,059 | A | * | 2/1970 | Minisian .................... G09F 3/10 428/40.1 |
| 3,550,842 | A | | 12/1970 | Scholz |
| 3,762,629 | A | * | 10/1973 | Bruno ..................... B65D 65/22 428/179 |
| 4,047,550 | A | * | 9/1977 | Scholz .................. B65D 29/04 383/117 |
| 4,503,561 | A | * | 3/1985 | Bruno .................... B65D 33/01 383/117 |
| 5,365,819 | A | * | 11/1994 | Maida .................. B31D 1/0031 83/695 |
| 5,538,778 | A | * | 7/1996 | Hurwitz ................ B65D 81/05 428/338 |
| 5,667,135 | A | * | 9/1997 | Schaefer ............ A47G 23/0216 220/738 |
| 5,667,871 | A | | 9/1997 | Goodrich et al. |
| 5,910,079 | A | * | 6/1999 | Watanabe ............ B31D 5/0065 493/464 |
| 2002/0185772 | A1 | | 12/2002 | Bittner |
| 2010/0196633 | A1 | * | 8/2010 | Kuchar .................... D04D 9/00 428/34.1 |
| 2014/0027553 | A1 | * | 1/2014 | Page ...................... B65H 23/06 242/159 |
| 2014/0119677 | A1 | * | 5/2014 | Lerner .................. B65B 43/267 493/227 |
| 2015/0140265 | A1 | * | 5/2015 | Page .................... B31D 1/0075 493/379 |
| 2015/0151895 | A1 | | 6/2015 | Zhang |
| 2015/0209992 | A1 | | 7/2015 | Lerner |
| 2015/0314936 | A1 | * | 11/2015 | Stack, Jr. ............. B65D 81/075 206/488 |
| 2016/0067938 | A1 | * | 3/2016 | Goodrich ............... B26D 1/405 493/361 |
| 2017/0203866 | A1 | | 7/2017 | Goodrich |
| 2020/0016860 | A1 | | 1/2020 | Cheich et al. |
| 2020/0039720 | A1 | * | 2/2020 | Goodrich ................ B32B 3/266 |
| 2020/0270048 | A1 | * | 8/2020 | Goodrich ............. B31D 5/0065 |
| 2021/0101356 | A1 | * | 4/2021 | Cheich ................ B31D 5/0065 |

FOREIGN PATENT DOCUMENTS

| | | | | | |
|---|---|---|---|---|---|
| CN | 102733266 | A | * | 10/2012 | |
| CN | 205062572 | U | * | 3/2016 | |
| CN | 109878897 | A | | 6/2019 | |
| DE | 1675907 | U | * | 5/1954 | |
| DE | 3339549 | A1 | | 5/1985 | |
| DE | 29506078 | U1 | * | 9/1995 | |
| EP | 1454837 | A1 | | 9/2004 | |
| FR | 2299954 | A | * | 9/1976 | |
| FR | 2319485 | | | 2/1977 | |
| GB | 1305829 | A | * | 2/1973 | ............ B32B 15/20 |
| JP | S4917672 | U | | 2/1974 | |
| JP | 50098194 | U | * | 8/1975 | |
| JP | 01226574 | A | | 9/1989 | |
| JP | 0450647 | A | | 4/1992 | |
| JP | 06320647 | A | * | 11/1994 | |
| JP | H07242268 | A | | 9/1995 | |
| JP | 08119334 | A | * | 5/1996 | |
| JP | 2018177304 | A | | 11/2018 | |
| JP | 2019104835 | A | * | 6/2019 | |
| WO | WO-9318911 | A1 | * | 9/1993 | ......... B31D 5/0065 |
| WO | WO 2020199549 | A1 | | 10/2020 | |

OTHER PUBLICATIONS

English translation of CN 109878897 A obtained from European Patent Office on Aug. 2, 2023, 4 pages.
English Translation of DE 3339549 A1 machine translation obtained from European Patent Office on Aug. 2, 2023, 4 pages.
English Translation of JP 01226574 A, machine translation obtained from European Patent Office on Feb. 10, 2023, 3 pages.
English Translation of JP 2018177304 A machine translation obtained from European Patent Office on Feb. 10, 2023, 8 pages.
English Translation of Jp H0450647 U obtained from Google Translate on Feb. 10, 2023, 4 pages.
English Translation of Jp H07242268 A machine translation obtained from European Patent Office on Aug. 2, 2023, 5 pages.
English Translation of Jp S4917672 U machine translation obtained from European Patent Office on Aug. 2, 2023, 2 pages,.
English translation of WO 2020199549 A1 obtained from European Patent Office on Feb. 10, 2023, 14 pages.
International Search Report for PCT/GB2020/052437 mailed Mar. 5, 2021.

* cited by examiner

PACKAGING MATERIAL

The invention to which this application relates is to improvements to a packaging material and, in particular, although not necessarily exclusively, to a packaging material which is formed of a recyclable material such as card and/or paper fibres.

Increasingly, the use of plastics-based packaging material is discouraged due to the environmental concerns about the recyclability of plastic material and the amount of plastics material which reaches landfill sites and/or creates hazardous waste.

It is known to be able to provide an alternative form of packaging material which is manufactured from new and/or recycled material and/or a combination of the same in for example, the form of card and/or paper-based products. One form of recyclable packaging material which is used typically comprises at least one sheet of the material and into which a plurality of slits are formed. Each of the slits may be provided with a shallow arrow shape or another suitable shape and the slits are arranged in rows, with each row located along an axis and the axes of the rows are respectively substantially parallel. Furthermore the axes are typically located such that they are perpendicular to the direction of movement of the leading edge of the packaging material from a roll of said material. Typically the slits in one row are located so as to be offset to the slits in adjacent rows with a pattern which repeats across and along the said sheet material.

The slits, shape of the same and pattern of the location of the same on the sheet material is all controlled so as to allow the packaging envelope of the material to be expanded from a first condition in which the slits are substantially closed and the sheet material is in a relaxed substantially two dimensional form, to a second condition in which the slits are moved to an opened position by the application of stretching forces to the sheet material to expand the same in one or more directions so as to expand the size of the slits, and expand the area and/or volume of the packaging material to move the same in to a more three dimensional form so that the packaging material provides a greater cushioning effect when it is used to surround and package an article or articles. Most commonly, the articles which are to be packaged, are surrounded with the said packaging material and the packaging material and articles are then moved into an outer container such as a cardboard box. It will therefore be appreciated that this arrangement of packaging for an article, is completely recyclable and therefore increases the attractiveness of use of this form of packaging material whilst, at the same time, ensuring that the protection of the article in question can still be achieved.

This form of packaging material has been known for some considerable time and is typically provided in a roll with a bespoke apparatus which means that a s the leading edge is pulled away from the roll there is sufficient resistance so as to cause the packaging material to also be moved to the second expanded condition.

Despite the advantages of use of this type of packaging material, there can still be a reluctance in the marketplace to do so and the Applicant has identified that part of this reluctance can be due to the fact that, while the packaging can be effective, it is difficult to be able to provide identification means on the packaging, such as an address label, instructions for use of the article which is packaged, packing codes for use at the time of packing the article, or the like. As a result, as labels can be more easily applied to the plastics packaging material this is a factor in the continued usage of plastic based packaging materials due to these practical requirements.

It is therefore an aim of the present invention to provide a packaging material which can be provided in the form of a card or paper based, preferably recyclable, packaging material which is expandable to a second condition for use whilst, at the same time, allowing the practical requirements of the application of one or more labels thereto and/or carrying of information thereon to be achieved.

It is a further aim of the present invention to provide the packaging material in a form which allows the application of, and retention on, the packaging material of identification and/or information means.

In a first aspect of the invention, there is provided a packaging material formed from at least one layer of sheet material, said sheet material having a first portion with a plurality of apertures formed in a predefined and repeating pattern on said sheet material such that, when a movement force is applied in at least one direction to the said sheet material, an opening effect is applied to at least some of said apertures and moves the sheet material from a first condition to a second expanded condition, wherein the sheet material includes at least one second portion which is provided with no apertures, or a different shape and/or pattern of apertures than the apertures of the first portion, so as to form a surface of the said second portion suitable for the application of a label and/or indications thereon when the sheet material is in the second expanded condition.

In one embodiment, said label is provided with an adhesive thereon to allow the application of the label to the surface of said second portion of the sheet material.

In one embodiment a layer of adhesive is applied to the said second portion of the packaging material so as to allow a further sheet material label to be adhered to the same or another part of the sheet material to be applied thereto and retained in position.

Typically, the said second portion of the sheet material has no apertures formed thereon and has a surface area with edges which is defined by the adjacent apertures of the first portion of the sheet material.

In one embodiment if the second portion includes apertures the spacing between those apertures is greater than the spacing between adjacent apertures formed in the predefined pattern on the first portion of the packaging material.

In one embodiment, a plurality of said second portions of sheet material are located at predetermined spaced apart locations within the said first portion of the sheet material.

In one embodiment, the said location and spacing of the said second portions is determined with respect to the particular intended use of the packaging material so that, for example, when a section of the sheet material have been cut from the packaging material supply to allow the packaging of at least one article, at least one of the said second portions is located on the separated section so as to allow the application of a label thereto, and/or marking of information thereon and therefore be related to the at least one article which has been packaged by that section of packaging material.

Typically, a plurality of said second portions will be present on the said separated packaging material section so as to allow the user to use one, some or all of said second portions so as to apply different labels and/or information to different second portions.

In one embodiment the said second portion is adapted so as to be less expandable than the first portion of the packaging material when a stretching or pulling force is applied to the sheet material.

Preferably the said second portions will not significantly expand during use of the packaging material and therefore provide a substantially uniform surface onto which a label can be adhered and, as a result of the uniformity of the surface, the label is more likely to remain adhered to the second portion than it would if it was applied to a surface of the said first portion of the expanded packaging material in which the apertures are provided and in relation to which relative movement of the packaging material occurs during use of the same.

In one embodiment, the size of the said second portions may be selected to suit the particular label type and the dimensions which are to be applied to the same.

Typically, the location and the number of said second portions so that there is sufficient spacing between the same and/or the size of the second portions are sufficiently small or appropriately shaped such that the same do not adversely significantly affect the expansion of the packaging material to form the beneficial cushioning effect of the same in use.

In one embodiment the location and size of the said second portions are provided in a repeating pattern along the length of the said sheet material first portion of the packaging material supply. Typically the packaging material supply is provided as a roll of said material to be dispensed in a first direction from a dispensing apparatus in which the roll is retained and the length of the sheet material portion is parallel to the direction of pulling force applied to the packaging material leading edge to dispense a section of the sheet material which is to be cut from the supply and used to package one or more articles.

In one embodiment the sheet material is formed of one or, alternatively a plurality of layers of material. Typically the material includes paper or card fibres and may also include other materials to provide strength and/or other required features.

Typically the apertures are provided in the form of slits.

In one embodiment the sheet material is formed of plurality of layers and the said first and second portions of the respective layers are located so as to be provided at the same respective locations. Alternatively at least one of said layers is provided with the said first and second portions and the remainder of the layers are provided with a pattern of slits of a first portion and no second portion is provided. However when the layers are provided together to form the sheet material the at least one layer with the second portions formed thereon is located so as to form an external surface of the sheet material.

In one embodiment a first of said layers with first and second portions forms a first external surface of the sheet material and a second layer with the first and second portions forms the opposing external surface of the sheet material. Preferably said external surfaces of the sheet material are provided so that the second portions are in register.

In one embodiment each of the layers has its own slit pattern to create interlocking layers of expansion sheet packaging materials of at least the first portions when the sheet material is expanded.

Typically when the sheet material is expanded to the second condition the apertures of the first portion expand to create the three dimensional packaging configuration of a series of cells of hexagons In a further aspect of the invention there is provided a packaging sheet material, said sheet material moveable from a first condition to a second, extended condition by the exertion of a movement force thereon, wherein said sheet material includes a first portion including apertures formed therein in a predefined pattern, and at least one second portion, and when the said movement force is applied to the sheet material the first portion expands to a greater extent than the second portion.

In one embodiment the expansion of the first portion includes the said first portion moving so as to be substantially non planer with respect to the second portion.

In a further aspect of the invention there is provided a method of packaging an article in a packaging sheet material, said method comprising the steps of forming a series of apertures in a repeating pattern on a first portion of at least one layer of the sheet material, providing the sheet material in a roll to be dispensed from a dispensing apparatus, pulling a leading edge of the said roll from the dispensing apparatus so as to open the apertures of the said first portion and expand the dimensions of the sheet material, removing a section of the sheet material from the roll and wrapping one or more articles in said sheet material and wherein providing a plurality of second portions in the sheet material with no or a lower density of apertures than in the first portion and providing said second portions in a predefined pattern on said sheet material such that when the section of sheet material of the required size to package said one or more articles is removed, at least one of said second portions is located on said section.

In one embodiment a label or information is applied to a surface of the said at least one second portion located on said section.

Thus, in accordance with the invention, the advantages of providing said substantially uniform portions is achieved without significantly affecting the packaging effect of the packaging material.

Specific embodiments of the invention are now described with reference to the accompanying drawings wherein:

FIGS. 1a-d illustrate conventional packaging material to which the application relates in a first, relaxed, condition and a second, expanded condition respectively;

FIGS. 2a and b illustrate packaging material in accordance with the invention in the first, relaxed, and second, expanded, conditions respectively;

Figure 1A:
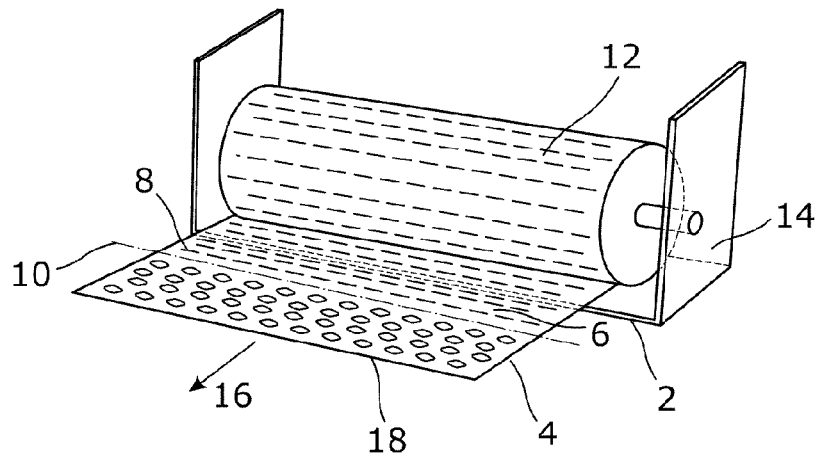
Figure 1B:
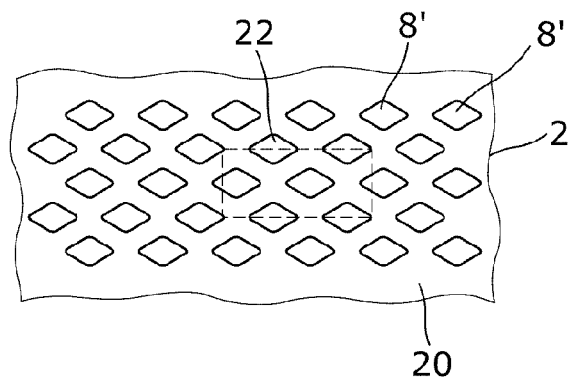
Figure 1C:
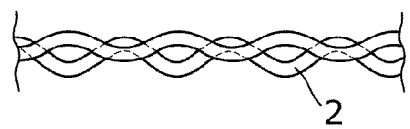
Figure 1D:
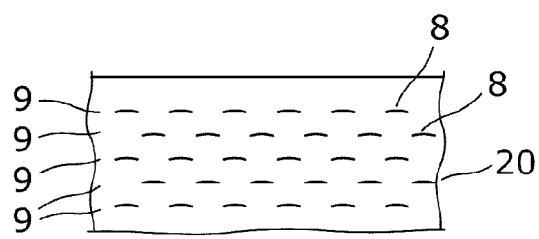

Referring firstly to FIGS. 1a-d, there is illustrated a packaging material 2 in accordance with a conventional form in which there is provided a sheet material formed of one or more layers and with opposing external surfaces 4 and 6. The sheet material has formed therein, a series of apertures in the form of slits 8 in a predefined pattern, with each of the slits provided in rows 9, each row with a longitudinal axes which are parallel and parallel to a general axis 10 which is perpendicular to the direction of movement 16 of the sheet material as will be explained. Furthermore, the slits 8 in a first row are offset along its longitudinal axis with respect to the location of the slits on the longitudinal axes of adjacent rows as shown in FIG. 1d which shows in detail a part of the sheet material 2 as shown in FIG. 1a. In FIGS. 1a and 1d it is shown that the sheet material may initially be provided as a packaging material supply in the first, relaxed, condition in which the slits 8 are closed and provided on a roll 12 and for use with the dispensing apparatus 14.

To use the packaging material a movement force is applied to the leading edge 18 of the sheet material in the direction of arrow 16 to draw the leading edge 18 from the roll and a retention force is created by the dispensing apparatus on the sheet material 2 which is sufficient to act to open the slits 8 due to the flexibility of the material, to open the same to form a series of substantially diamond or hexagon shaped apertures 8' as shown towards the leading edge 18 in FIG. 1*a* and in FIG. 1*b*, which shows the detailed part 20 of the packaging material in the expanded, second condition. Thus, in the second condition the area and volume of the sheet material 2 is increased so as to provide a three dimensional packaging material and provide a greater cushioning effect and coverage area for the packaging material when used to surround and package an article. It will be seen that the whole of the section of the sheet material which has been removed from the dispensing apparatus is expanded to the second condition of FIG. 1*b*, and FIG. 1*c* illustrates that the packaging material extends from a substantially thin section to have an increased depth so that the volume of the packaging material also increases. Typically, an appropriate sized section of the sheet material for the packaging of the one or more articles is cut-off from the roll 12 to provide a sufficient amount of the packaging material to enclose the article which is to be packaged and provide sufficient cushioning effect on the article so as to protect the article during the subsequent transportation of the same.

Thus, it may be the case that the sections of the sheet material which are successively separated from the roll for use, are separated in a relatively random manner and in an uncontrolled manner so that there can be no certainty as to the accuracy of the dimensions of the section of the packaging material which is used.

Conventionally, if an attempt was made to apply a label to this conventional sheet material, then if applied when the packaging material is in the first, relaxed condition, when the packaging material is expanded to the second condition, the label is susceptible to being torn or simply being pushed off the sheet material or, if the label is applied when the sheet material has been moved to the second, expanded, condition of FIGS. 1*b-c*, the label is applied to a non-uniform outer surface of the expanded packaging material which is difficult to achieve and typically there is insufficient retention strength of adhesion between the label and the said surface so that the label simply detaches from the sheet material very quickly. Furthermore, any attempt to directly print or write indications on the sheet material is difficult to do and even if successful the indications become distorted due to the movement of the sheet material.

This therefore means that important instructions, identification means or information which can be carried on the packaging material, is not retained on the packaging material.

Figure 2A:
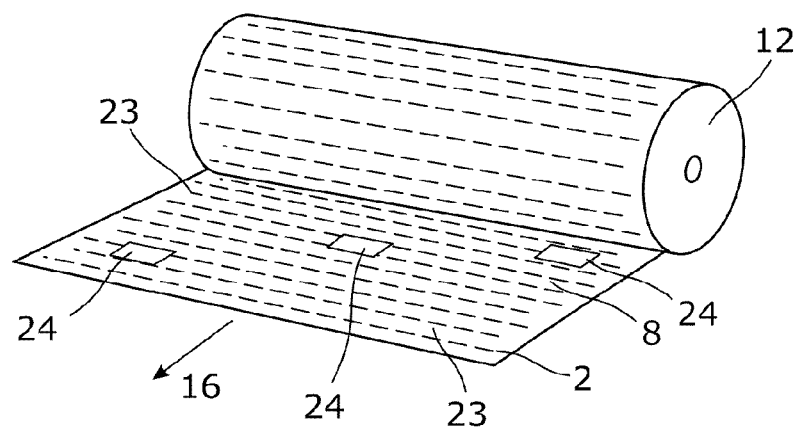
Figure 2B:
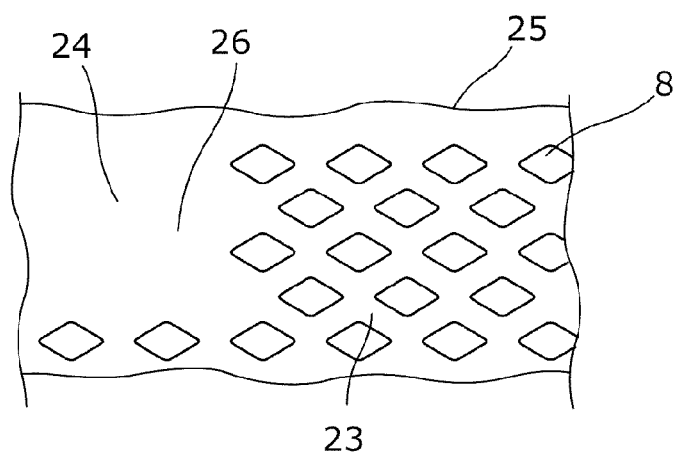

In accordance with the invention, there is provided a packaging sheet material of an improved form as illustrated in FIGS. 2*a* and *b*. In this embodiment the packaging material includes a first portion 23, which is typically the majority of the sheet material and in which a series of apertures in the form of slits 8 in a predefined pattern are provided as shown and which can be provided to have a similar form, when in the first, relaxed condition to that shown in FIGS. 1*a* and *d* and when in the second, expanded condition, to have a similar form to that shown in FIGS. 1*b* and *c*. As such the slits 8 of the first portion 23 can still be extended and opened so as to form substantially diamond or hexagon shaped apertures and so move the sheet material to the second, expanded condition as shown in the first portion 23 of the detailed part 25 of the sheet material of the invention as shown in FIG. 2*b* to provide the sheet material with the required packaging and protection effect. However, in accordance with the invention, there are also provided a series of second portions 24 which are provided at predetermined spaced locations on the sheet material as shown in FIG. 2*a* and these portions, in this embodiment, do not have any slits formed therein and instead form a substantially uniform continuous external surface 26 of the sheet material. It is the surfaces 26 of these second portions 24 which are therefore adapted to selectively be used to receive labels 22 and/or printed or written indications thereon and, as the said second portions 24 cannot significantly change condition when the movement or expansion force 16 is applied to the sheet material to move the sheet material to the second, expanded, condition so it will be appreciated that the adhesive strength of the connection between the label 22 and the surface 26 of the second portion 24 is significantly greater than if the label were to be applied to the surface of the first portion due to the apertures formed in the same. This is the case if the label is applied to the surface 26 when the sheet material is in the first, relaxed condition and the second, expanded, condition. As such, the label 22 and more importantly the information thereon is retained on the packaging material 2 during use of the same so that the said information is available during onward shipping of the article and/or to the end recipient of the article. As a result this potentially reduces the need for further packaging material or containers to be used.

Figure 3:
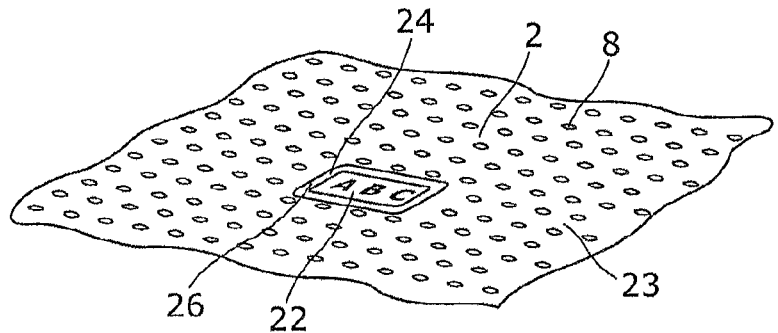
FIG. 3 illustrates the packaging material of FIGS. 2a and b with a label applied thereto.

FIG. 3 illustrates the packaging material 2 in accordance with the invention with a label 22 applied to the surface 26 of one of the second portions 24 of the packaging material and it will be appreciated that the second portions 24 can be provided at a spacing, and of a dimension, to suit particular uses whilst, at the same time, ensuring that the expansion and packaging effect of the packaging material 2 can still be achieved.

Figure 4:
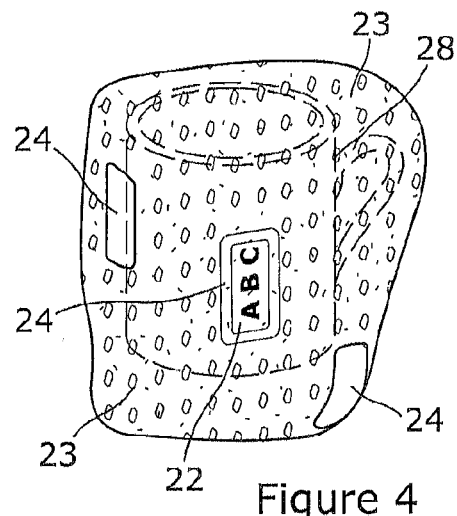
FIG. 4 illustrates an article packaged using the packaging material in accordance with the invention of FIGS. 2a-3.

FIG. 4 illustrates an article 28 which has been packaged using packaging material 2 in accordance with the invention and it is shown that the protection of the article 28 is achieved as the first portion 23 of the sheet material can still be expanded, and a sufficient proportion of the sheet material is formed as the first portion 23 so as to ensure that the sheet material can still be sufficiently expanded, with the proportion of the first portion 23 of the sheet material to the second portions 24 of the sheet material, in one embodiment, being at least 75% whilst, at the same time, allowing identification labels 22 to be applied and/or information to be applied directly onto and retained on the surface 26 of the selected second portion 24 and as many of the other second portions 24 as required.

Figure 5A:
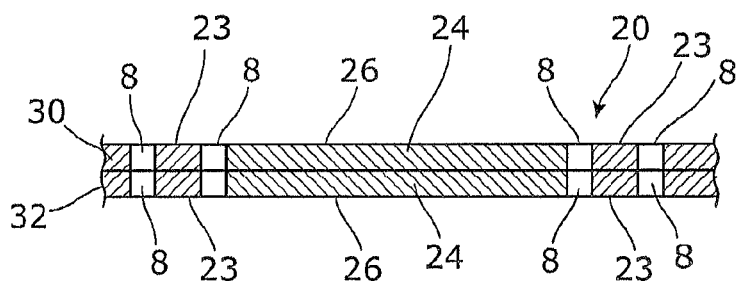
FIGS. 5a and b illustrate cross sectional views of packaging material in accordance with further embodiments of the invention.

FIGS. 5*a* and *b* illustrate further embodiments of the invention in which, rather than the sheet material being formed of a single layer, the sheet material 2 is formed of a plurality of layers.

Figure 5B:
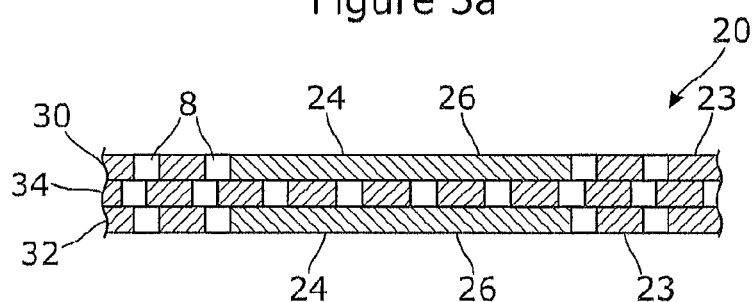

In FIG. 5*a* the part 20 of the sheet material 2 is shown in cross section and is formed of a first layer 30 and a second layer 32. In this embodiment each of the layers has the same configuration of first and second portions and are adhered together so that the first and second portions are in register. In FIG. 5*b* there is provided a sheet material formed with a third layer 34 and in this embodiment the layers 30, 32 are provided in the same arrangement as in FIG. 5*a* and sandwich the layer 34 which is provided with no second portion and is therefore wholly formed with slits 8 in a repeating pattern which may be the same as or different to the pattern of slits on the first portions 23 of layers 30 and 32.

Thus, in accordance with the invention there is provided a packaging material 2 which has the beneficial characteristics of recycling and providing a cushioning and protective effect on the article while, at the same time allowing the advantage of the provision of portions on which labels and information be provided and retained during use of the packaging material.

The invention claimed is:

1. A recyclable packaging material formed from at least one layer of sheet material, said sheet material having a first portion with a plurality of apertures formed in a predefined and repeating pattern on said sheet material such that, when a movement force is applied in at least one direction to the sheet material, an opening effect is applied to at least some of said apertures and moves the sheet material from a first condition to a second, expanded, condition, wherein the packaging material is expanded to create a three dimensional packaging configuration to increase the volume of the packaging material to create a cushioning effect in the second condition, and wherein the sheet material includes paper or card fibres, and includes a plurality of second portions each having edges defined by the adjacent apertures of the first portion, said second portions provided with no apertures, so as to form a surface of the second portion that will not significantly expand and is for the application of a label and/or indications thereon when the first portion of the sheet material is in the second expanded condition and wherein the packaging material is provided as a roll to be dispensed in a first direction from a dispensing apparatus in which the roll is retained so as to dispense said first portion of the sheet material with a length defined by a user cutting said first portion from the roll so as to be used to package one or more articles, said apertures provided along the roll such that the detached first portion and the apertures therein extend from the leading edge of the sheet material to the cut edge, wherein said plurality of second portions are located at predefined spaced apart locations, and located within said first portion of the sheet material such that there is sufficient spacing between the second portions and/or the size of the second portions are sufficiently small such that the second portions do not significantly affect the expansion of the first portion when the movement force is applied thereto, and wherein when said sheet material is in both the first condition and second, expanded, condition, said surface of the second portions are suitable to receive the label with a layer of adhesive thereon to retain the label on said surface and/or indications in the form of ink which is printed or handwritten onto said surface.

2. The material according to claim 1 wherein volume of the packaging material is increased in the second condition by the opening of the apertures.

3. The material according to claim 1 wherein the location and spacing of the second portions are determined with respect to the particular use of the packaging material such that when the first portion of the sheet material of a sufficient size to be used to package a known article or articles is removed from the roll said plurality of second portions are located on the first portion.

4. The material according to claim 1 wherein—the length of the sheet material to be dispensed is parallel to the direction of the application of the movement force to the leading edge of the sheet material.

5. The material according to claim 1 wherein the sheet material is formed of one layer.

6. The material according to claim 1 wherein the sheet material is formed of a plurality of layers.

7. The material according to claim 6 wherein the first and second portions of the respective layers are located in register so as to be provided at the same respective locations.

8. The material according to claim 7 wherein at least one of said layers is provided with the first and second portions and the remainder of the layers are provided with a pattern of slits of a first portion and no second portion is provided and the at least one layer with the second portions formed thereon is located to form an external surface of the sheet material.

9. The material according to claim 6 wherein a first of said layers is provided with first and second portions and located to form a first external surface of the sheet material and a second of said layers is provided with first and second portions and located to form the opposing external surface of the sheet material.

10. The material according to claim 9 wherein said external surfaces of the sheet material are provided so that the second portions are in register.

11. The material according to claim 6 wherein each of the layers has its own aperture pattern to create interlocking layers of expansion sheet packaging materials of at least the first portions when the sheet material is moved to the second, expanded, condition.

12. The material according to claim 1 wherein the apertures of the first portion expand to a configuration of a series of cells of hexagons in the second condition.

13. The material according to claim 1 wherein the apertures are provided in the form of slits and which, when the sheet material is moved to the second condition, open.

14. A packaging sheet material, said sheet material moveable from a first condition to a second, extended condition by the exertion of a movement force thereon, wherein the packaging sheet material is expanded to create a three dimensional packaging configuration to increase the volume of the packaging sheet material to create a cushioning effect in the second condition, wherein said sheet material includes a first portion including apertures formed therein in a predefined pattern, and a plurality of second portions each having edges defined by the adjacent apertures of the first portion, and when the movement force is applied to the sheet material the first portion expands to an expanded condition, wherein the second portions are provided with no apertures so as to form a surface that will not significantly expand such that the surface of the second portions are suitable to receive a label with a layer of adhesive thereon to retain the label on said surface and/or indications in the form of ink which is printed or handwritten onto said surface and wherein the packaging sheet material is provided as a roll to be dispensed in a first direction from a dispensing apparatus in which the roll is retained so as to dispense said first portion of the sheet material with a length defined by a user cutting said first portion from the roll so as to be used to package one or more articles, said apertures provided along the roll such that the detached first portion and apertures therein extend from the leading edge of the sheet material to the cut edge, and wherein said plurality of second portions are located at predefined spaced apart locations, and located within said first portion of the sheet material such that there is sufficient spacing between the second portions and/or the size of the second portions are sufficiently small such that the second portions do not significantly affect the expansion of the first portion when the movement force is applied thereto.

15. The material according to claim 14 wherein the expansion of the first portion includes the first portion moving so as to be substantially non planer non-planar with respect to the second portion.

16. A method of packaging an article in a packaging sheet material, said method comprising the steps of forming a series of apertures in a repeating pattern on a first portion of at least one layer of the sheet material, providing the sheet material in a roll to be dispensed from a dispensing apparatus, pulling a leading edge of the roll from the dispensing apparatus so as to open the apertures of the first portion and expand the dimensions of the sheet material, removing said first portion of the sheet material with a length defined by a user cutting said first portion from the roll, such that the detached first portion and the apertures therein extend from the leading edge of the sheet material to the cut edge, and wrapping one or more articles in said sheet material and providing a plurality of second portions in the sheet material with no apertures and each of said second portions having edges defined by the adjacent apertures of the first portion, and a surface which will not significantly expand providing said second portions in a predefined spaced apart pattern on said sheet material and locating said second portions within said first portion such that there is sufficient spacing between the second portions and/or the size of the second portions are sufficiently small such that the second portions do not significantly affect the expansion of the first portion when the pulling force is applied thereto, and such that when the section of sheet material of the required size to package said one or more articles is removed, at least one of said second portions is located on said section and characterized in that when said sheet material is in both the first condition and second, expanded, condition, said surface of the second portions are to receive a label with a layer of adhesive thereon to retain the label on said surface and/or indications in the form of ink which is printed or handwritten onto said surface so as to allow the application of said label and/or indications to said surface of the at least one second portions located on said section.

17. The method according to claim 16 wherein the label and/or indications include an address to which the packaged article is to be posted or delivered.

* * * * *